United States Patent

Etes

[15] 3,640,741

[45] Feb. 8, 1972

[54] COMPOSITION CONTAINING GEL

[72] Inventor: Donald E. Etes, Crystal Lake, Ill.

[73] Assignee: Hollister Incorporated

[22] Filed: Feb. 24, 1970

[21] Appl. No.: 13,608

[52] U.S. Cl. ................... 106/170, 106/189, 106/197 CM, 106/198, 106/208, 106/213, 128/283, 252/316, 260/209.6, 260/231 CM, 424/32, 424/33, 424/35, 424/361, 424/362
[51] Int. Cl. ............. C08b 19/10, C08b 21/30, C08b 21/32
[58] Field of Search ................ 424/32, 33, 35; 260/209.6, 260/231; 106/189, 170, 197 CM, 208; 252/316

[56] References Cited

UNITED STATES PATENTS

| | | | |
|---|---|---|---|
| 2,420,308 | 5/1947 | Gates | 260/209.6 |
| 2,426,125 | 8/1947 | Steiner | 260/209.6 |
| 3,079,303 | 2/1963 | Raff et al. | 424/33 |
| 3,279,996 | 10/1966 | Long et al. | 424/32 |
| 3,302,647 | 2/1967 | Marsan | 128/283 |

FOREIGN PATENTS OR APPLICATIONS

| | | | |
|---|---|---|---|
| 659,390 | 3/1963 | Canada | 424/32 |

Primary Examiner—Donald E. Czaja
Assistant Examiner—Ronald W. Griffin
Attorney—Hofgren, Wegner, Allen, Stellman and McCord

[57] ABSTRACT

A new plastic composition which is slow dissolving in aqueous media and can be used to slowly release medication or other additive ingredients in an aqueous environment, which plastic composition is prepared by cross-linking a hydrophilic colloid such as carboxymethyl cellulose gum or alginate gum with a cross-linking agent, usually a polyol such as propylene glycol, in a relatively nonreactive water soluble carrier such as glycerol. The total composition, including the carrier, sets up into a plastic gel, the consistency of which can be varied by varying proportions of ingredients. The reaction can be speeded or driven to a more completely cross-linked state by using a catalysts such as aluminum or calcium salts. Complexing agents can be included for complexing the catalysts and releasing it slowly throughout the reaction to slow the reaction down where desired. Generally, the reaction proceeds faster in a close to neutral or basic medium at pH's ranging up to 10 or 11 and slower in an acid medium at pH of 5 and below so the rate of reaction can be controlled by adjusting the pH. Usually the composition will contain medication or cosmetic additives or ingredients and it can be molded by extrusion or the like into any predetermined form, e.g., in the form of a ring. In a preferred form, the composition has excellent pressure sensitive adhesive properties and these properties are very pronounced where the hydrophilic colloid used is carboxymethyl cellulose.

14 Claims, 4 Drawing Figures

PATENTED FEB 8 1972 3,640,741
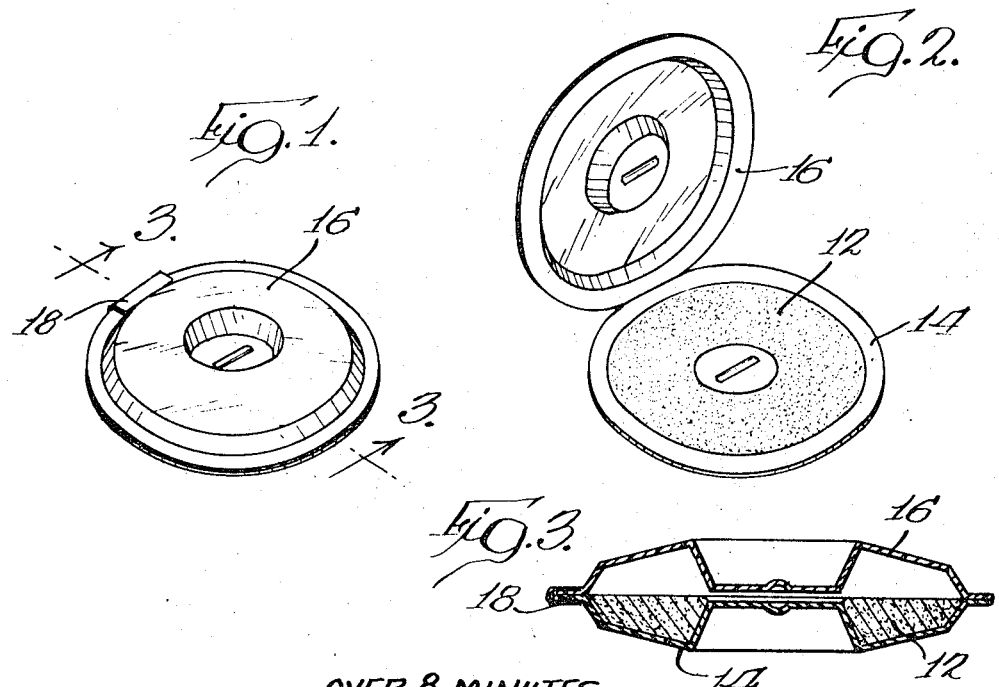
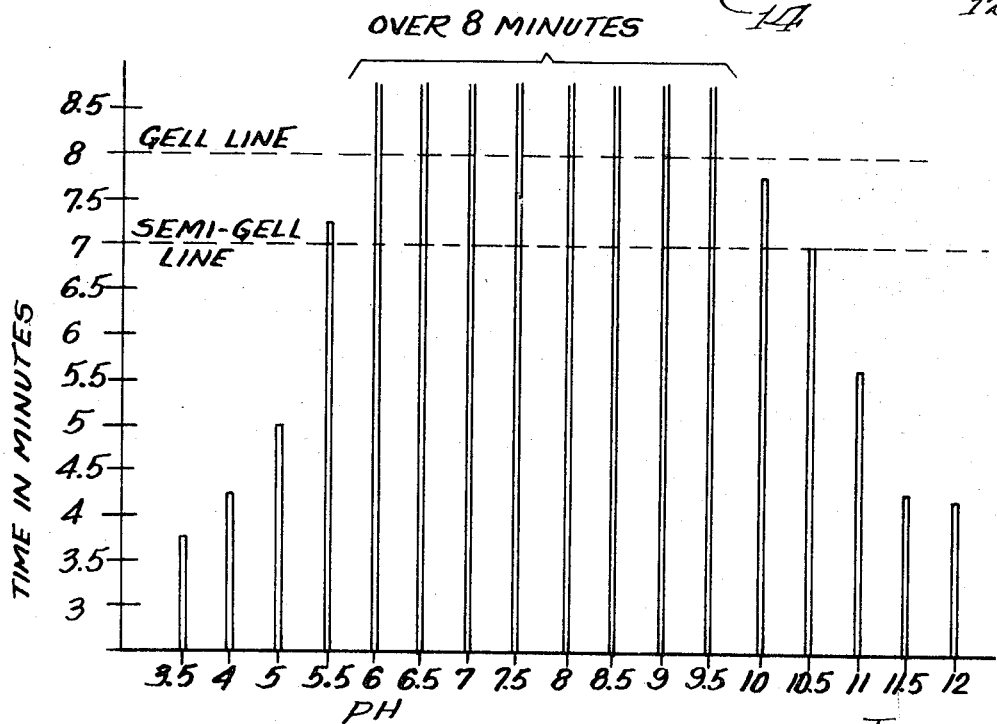
Inventor:
Donald E. Etes
By Hofgren, Wegner,
Allen, Stellman & M?Cord
Att'ys

COMPOSITION CONTAINING GEL

BACKGROUND OF THE INVENTION

1. Field of the Invention

This invention relates to solidified plastic compositions which are slowly soluble in an aqueous medium and which are capable of releasing an additive agent such as a medication into an aqueous medium by slowly dissolving.

2. Description of the Prior Art

Presently, silicone rubber is used as a drug carrier in the medical field. See, for example, Long et al., U.S. Pat. No. 3,279,996. However, in many applications the use of silicone rubber has been discontinued because the rubber is not absorbed by the body but remains in the body intact, creating complications later.

Karaya has been used as a healing powder to thicken glycerine or the like and form gellike materials for use as sealing rings or the like, e.g., around stoma. See U.S. Pat. No. 3,302,647 issued to Arthur E. Marsan on Feb. 7, 1967. However, Karaya is a nutrient substance which is capable of supporting substantial bacterial or other growth and in some uses this can be undesirable. Also, it has been found that gels containing Karaya do not dissolve as readily as they should for optimum use in releasing medication or the like. Karaya gels also have limited shelf life, hardening after storage for an extended period under ambient conditions.

SUMMARY OF THE INVENTION

This invention provides a plastic or gel product which slowly dissolves in an aqueous medium and can be used for slowly releasing additives, such as medications, over an extended period of time. The invention further relates to a method of making such a plastic or gel product.

The product basically is a slowly water-soluble gel which functions as a carrier for the additive to be released. In the preferred form, the gelling agent in the gel is a "nutrient-free" reaction product of a hydrophilic colloid and a polyol which cross-links the colloid. The cross-linked reaction product is formed in a water-soluble liquid organic medium and the entire reaction mass including the liquid medium is gelled by reacting the colloid with the polyol in the presence of the liquid medium. The gelling agent entraps the liquid medium where a viscous, elastomeric or solid gel, usually "soft" solid, is formed or can be diluted somewhat by the liquid medium or other diluents where a more fluid consistency is desired, e.g., as a base for a lotion. The gelled product is slowly, but completely, soluble in an aqueous medium over an extended period of time. It is soluble in mammal body fluids and can be assimilated by the body.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 is a perspective view of a container containing a molded mass of one form of plastic product provided by this invention;

FIG. 2 is a perspective view of the container of FIG. 1 in open condition showing the contained molded mass;

FIG. 3 is an enlarged section along line 3—3 of FIG. 1; and

FIG. 4 is a chart showing varying gel consistency or reaction speed caused by varying the pH of the reaction system during manufacture of the gel.

DESCRIPTION OF THE PREFERRED EMBODIMENT

Turning first to FIGS. 1 through 3, a molded plastic mass or ring 12 is shown molded in situ and contained within container 14 in the form of a ring. A suitable cover 16 is provided for container 14 and can be hingedly secured to container 14 by means of a tape as at 18. The container 14 and cover 16 can be sealed closed along their seam line to maintain the molded plastic mass or ring 12 in a sterile condition, if desired.

The plastic mass 12 is composed of the reaction product of a "nutrient-free" hydrophilic colloid, usually particulate or powdered, and a cross-linking agent, usually a liquid polyol, in the presence of a suitable "nutrient-free" organic liquid medium such as glycerin. The term "nutrient-free" as used herein is intended to define materials which have no nutrient value or have a nutrient value at a controllable level which can be used for support of controlled amounts of bacterial growth. The entire mass is shelf stable under storage conditions but is slowly soluble in an aqueous or mammal body fluid medium and can contain medication or other additives which are slowly released into the aqueous medium during dissolving of the mass.

The plastic mass has various advantageous properties. Preferably it is nontoxic and its plastic characteristics permit ease of molding, e.g., by injection molding, extrusion, compression molding and casting in sheet form. It can be tacky to the touch when moistened and can make a good adhesive. The mass can be edible where the base material is F.D.A. approved for human consumption. Most important, the mass is absorbed by the chemical processes of the human body as it becomes dissolved. Where a synthetic colloid gum, e.g., carboxymethyl cellulose gum, is used in making the reaction product, the resulting mass does not support any bacteria growth. Where a natural alginate gum is used, only very little bacteria growth, if any, is evident and can be eliminated by including a small amount of preservative such as methyl parsept. The cross-linked alginate gum gels are further advantageous in that they have a tendency to become tacky or tackier with slight swelling at external human body temperature and moisture conditions, but they nevertheless retain their properties at elevated temperatures. For example, such gels retain their excellent properties even after a high-temperature accelerated aging test in an oven at 250° C., 15 p.s.i., for 2 hours with no change whatsoever, indicative of their excellent shelf life.

The gums used herein support substantially less bacteria growth than does Karaya. Especially useful are the normally solid particulate or powdered synthetic cellulose gums such as carboxymethyl cellulose, water-soluble salts of the cellulose gums and the particulate or powdered natural alginate gums. Such alginates are available as dry powders from Kelco Company, San Diego, Cal., under the trade names Keltrol and Kelcoloid. Keltrol is reported to be a xanthin gum product and is classified as a carbohydrate. It is a complex polysaccharide gum having a molecular weight of more than 1 million. The polymeric molecule is believed to be linear in structure with beta linked backbones containing d-glucose, d-manose and d-glucoronic acid groups with approximately one d-manose side chain unit for every eight sugar residues and one d-glucose side chain residue for every 16 sugar residues. The polysaccharide structure is partially acetylated and contains pyruvic acid attached to the glucose side chain residue. The molar ratio of d-glucose:d-manose:d-glucoronic acid is reported to be about 2.8:3.0:2.0.

The alginate can be any of the water-soluble alginates including the alkali metal (sodium, potassium, lithium, rubidium and cesium) salts of alginic acid, as well as the ammonium salt, the magnesium salt and the soluble alginates of an organic base such as mono-, di-, or tri-ethanolamine, aniline and the like. Also useful are the substituted alginates such as the phospho-alginates. Such soluble alginates can be prepared by methods well known in the art such as those in U.S. Pat. Nos. 1,814,981, 2,036,922, 2,039,934, 2,097,228 and 2,128,551. For background material with regard to such alginates, attention is also directed to Steiner U.S. Pat. Nos. 2,441,729 and 2,426,125, Steiner et al. 2,463,824, and Gates U.S. Pat. No. 2,420,308. The above patents are hereby incorporated herein by reference so far as they disclose alginates and their manufacture, any of which soluble alginates can be used in accordance with the present invention. The preferred alginates are the sodium and potassium alginates.

The suitable cross-linking agents are water-soluble polyols and especially useful are alkylene glycols such as propylene glycol, butylene glycol, ethylene glycol, triethylene glycol, and glycerin. Preferably the polyols are "nonaqueous," containing their normal hydroscopically absorbed water content, e.g., up to 10 percent. Added water in minor amounts less than 50 percent can be used although added water is not preferred. The polyols should be reactive with the gum, preferably at room temperature, for purpose of cross-linking the gum. The preferred polyols are those providing a cross-linking chain length of at least three atoms, usually carbon or carbon and ether oxygen atoms, exclusive of terminal oxygens from reacted terminal hydroxyls. The water-soluble polyol cross-linking agent is used in an amount sufficient to cross-link the gum but it can also be used in an excess over and above the cross-linking amount so that it also serves as the liquid medium in which is included or occluded as part of the final gelled or solidified mass. When used only for cross-linking purposes, usually 0.5 to 2 or 3 parts polyol per part by weight gum will be sufficient although amounts within a broader range such as 0.1 to 10 parts per part by weight gum can be used depending on the amount of cross-linking desired and the amount of cross-linking agent which is to be used as an excess to also supply the liquid medium. In the preferred compositions about 0.5 to 6 parts polyol per part of gum are used and 0.15 to 2.5 parts per part gum are especially preferred.

The liquid medium is a water-soluble organic compound which is preferably nontoxic and which is nonreactive with the cross-linked reaction product once the reaction product has become fully cross-linked. As noted above, the cross-linking agent, which is reactive with the gum but not with the fully cross-linked reaction product, can advantageously be used as the liquid medium. Other organic compounds can also be used in lieu of or as a supplement for the excess cross-linking agent. Glycerin has been found to be an excellent liquid medium for the cross-linked alginates and for certain cross-linked carboxymethyl cellulose gums while propylene glycol is very suitable for use both as a cross-linking agent and a liquid medium. Increasing the amount of glycerin in the composition correspondingly increases the tackiness of the gel up to the point where the gel can no longer hold the amount of glycerin used. The preferred compositions contain at least some glycerin in the liquid medium for improved tackiness. The liquid medium will usually be present in an amount between 0.5 and 40 parts by weight per part by weight of total alginate and/or the cellulose gum. Preferably, the liquid medium is present in amounts between 1 and 20 parts by weight per part gum and in especially preferred compositions the amount is between 2 and 10 parts by weight per part by weight gum. In cellulose gum compositions, if glycerin is not used as a liquid medium, it has been found advantageous to include a small amount of glycerin, e.g., about 0.1 up to about 0.5 parts per part by weight cellulose gum, to function as a wetting agent for the cellulose gum. Although some cellulose gums are highly reactive toward glycerin, some such gums are completely nonreactive and where a highly reactive gum is used, it has been found advantageous to dilute the gum with a nonreactive gum and thereby prevent undue reaction between the glycerin and reactive gum when the glycerin is added to the gum powders as a wetting agent.

In some compositions where more body and more complete gelling is desired, it is advantageous to include starch as a filler. The starch appears to initially function as a gelling agent giving the formulation a higher viscosity but then, at least in the case of the alginates, appears to retard the reaction of the alginate with the cross-linking agent. After cross-linking is complete, the starch imparts a more rigid gel structure to the cross-linked mass. Any of a variety of starches, such as wheat starch, corn starch, potato starch and gelatinized starches, as well as proprietary starch compositions which are sold for gelling purposes, can be used. When starch is used, it will usually be incorporated in an amount between 0.05 and 1 part by weight per part by weight total liquid medium and cross-linked gum and in especially preferred starch-containing compositions it is used in an amount between 0.1 or 0.25 and 0.5 parts by weight based on total liquid medium and cross-linked gum.

Although it has been found that the synthetic carboxymethyl cellulose gums generally react readily with the cross-linking agent at ambient temperatures, in the case of alginates it is sometimes desired to speed the reaction by using a catalyst or accelerator. In other cases where the reaction proceeds too fast, it may be desired to retard the reaction with an inhibitor or even slow down the function of a catalyst where a catalyst is used. The cross-linking reaction appears to be exothermic in all cases so that cooling the reacting mass may be useful to slow the reaction. However, it is desired to carry the reaction out at ambient or room temperatures so it is preferred to regulate the reaction with catalysts, inhibitors and the like, rather than by control of the reaction temperature. Accordingly, I have found that the reaction usually proceeds slower at a lower pH, e.g., below 3 and faster at a higher pH, e.g., above about 8, so that small amounts of acids and bases can be used to control the reaction to some extent. I have further found that aluminum and calcium salts, such as aluminum hydroxide, calcium carbonate and calcium chloride, are excellent catalysts, as are buffer salts such as sodium benzoate, for speeding up the cross-linking reaction especially where alginates are used as the gums. Where catalysts are used, they are preferably used in the range of from 0.2 to 2 parts by weight, and more often about 1 part by weight, per part by weight alginate.

Although the cellulose gums do not support bacterial growth and the growth-supporting properties of the alginate gums used in the present compositions are minimal to nonexistent, to be on the safe side it is sometimes advantageous to include a preservative such as sodium benzoate or methyl parsept or other well-known preservatives in an amount between about 0.05 and about 0.5 percent, e.g., about 0.1 percent, based on total composition. The use of a preservative is especially advantageous where Karaya is included in the composition in addition to the cellulose or alginate gum because Karaya has been found to support bacterial growth, although with some Karaya-containing compositions no amount of parsept or other preservative will completely eliminate bacteria although it will inhibit bacteria growth.

In some compositions designed for specific purposes it may be desirable to provide nutrient value in the composition to promote bacterial growth. For example, the present gels can be used as media for bacterial studies and it may be desired to provide a low-controlled nutrient value in the composition. This can be done by making the composition with alginate gum or mixtures of alginate gum and carboxymethyl cellulose gum, with the alginate gum present in an amount directly proportional with the desired nutrient value. If still greater nutrient value is desired for bacterial growth, i.e., above and beyond what is provided by a composition made solely from alginate gum, Karaya can be added to the reaction mass in whatever amount is needed to provide the additional nutrient value. In such compositions, parsept or other preservative is usually omitted. In this manner compositions having predetermined or controlled nutrient values over a wide range can consistently be prepared.

The following are more specific examples of compositions which can be made in accordance with the present invention:

EXAMPLES 1 THROUGH 19

For each of Examples 1 through 19, the materials indicated in Table I for each example, with the exception of the propylene glycol, were added to and blended in a dough mixer or blender and after the ingredients were thoroughly mixed, the propylene glycol was added and also blended in. The reaction proceeded and appeared to be exothermic and within about one-half hour, more or less, the materials formed a gel. Each example was permitted to stand at room temperature for 24 hours.

EXAMPLE 21

The procedure of Example 20 was repeated except that 10

TABLE I

| Example | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Ingredients: | | | | | | | | | | | | | | | | | | | |
| Keltrol [1] | 10 | 10 | | | 10 | 20 | 20 | | 10 | 10 | 10 | 20 | 40 | 10 | 20 | 10 | | | |
| Kelcoloid [1] | | | 10 | 10 | | | | 20 | | | | | | | | | | | |
| CMC 7MF [2] | 15 | | | | | | | | | | | | | | 20 | 10 | 10 | 10 | 15 |
| Karaya | | | | 10 | 20 | | | | | | | | | | | | | | |
| Glycerin | 50 | 50 | 20 | 100 | 100 | 100 | 100 | 90 | 50 | 50 | 50 | 100 | 100 | 100 | | | | | |
| Propylene glycol | 20 | 20 | 19.7 | 40 | 40 | 40 | 40 | 50 | 20 | 20 | 20 | 40 | 40 | 40 | 40 | 100 | 40 | 40 | 40 |
| Methyl parsept | | | | | | | | | | | | | | | 100 | 40 | 19.7 | 19.7 | 19.7 |
| Calcium carbonate | | 10 | 10 | | | | | | | | | | | | | | | | |
| Calcium chloride | | | | | | | 1 | | | | | | | | | | | | |
| Benzoic acid | | | | | | 2 | 1 | | | | | | | | | | | | |
| Instant clearjel starch [3] | 19.7 | 19.7 | 20 | 39 | 39 | 48 | 48 | 38 | | | | 48 | 20 | 48 | 38 | 38 | 20 | 15 | 10 |
| Potato starch | | | | | | | | | 19.77 | | | | | | | | | | |
| Corn starch | | | | | | | | | | 19.77 | | | | | | | | | |
| Wheat starch | | | | | | | | | | | 19.77 | | | | | | | | |

[1] Sodium alginates.
[2] Carboxymethylcellulose.
[3] 100% food starch.

Of the above, the compositions of Examples 1 through 4 set up to good firm gels and were rated very good products. It was noted that when the product of Example 3 was moistened, it did not become slippery as did the products of Examples 1 and 2. The composition of Example 4 was capable of supporting bacterial growth. The composition of Example 5 had only fair body but the body was better than when Karaya was used alone. Examples 6 through 8 were all very good products and the products of Examples 9 through 11 also looked very good and did not become slippery when dampened. Examples 9 through 11 illustrate that various different types of starches can be used. In Examples 2, 3, 6 and 7, the calcium carbonate and benzoic acid increased the reaction rate. Compositions about the same as that of Example 6, with the exception that varying amounts of calcium chloride were substituted for the benzoic acid, were also prepared and calcium chloride alone was found to also speed up the reaction. In the calcium chloride runs, the calcium chloride was premixed dry with the alginate and the dry mix was sifted into the glycol during mixing to minimize the possibility of the calcium chloride settling out. The above and other examples also showed that, with a given formulation, the maximum amount of glycerin or other liquid medium for a homogeneous gel can be readily established simply by trying different amounts. If a solid gel product is desired, the amount of liquid medium should be kept low enough to be locked in by the cross-linked structure as it forms.

After standing for 24 hours, the composition prepared in Example 12 had very good body and very good tackiness and the composition of Example 13 had better body but not as much tackiness of Example 12 indicating that either an increase in the starch content or a decrease in the alginate content or both increase the tackiness of the molded composition. Example 14 which had a very soft body but very good tack further illustrates this in that the alginate content was further decreased. Example 15 took a while longer than a 24-hour standing period to develop reasonably good tack. Example 16 is another composition having very soft body and very good tack and is useful mainly for adhesive purposes. The products of Examples 17 through 19 were all very good gels and did not become slippery when wet. The pot life for these compositions after addition of the propylene glycol was noticeably shorter than that of other compositions which did not contain calcium carbonate illustrating that calcium carbonate was functioning as a catalyst or accelerator for the cross-linking reaction.

EXAMPLE 20

Fifty parts by weight glycerin were mixed with 20 parts by weight propylene glycol and 19.77 parts by weight instant clear gel starch was slurried into the mixture followed by 10 parts by weight Keltrol and the composition was mixed until uniform. The composition was then poured into molds and was permitted to set at ambient temperatures for 24 to 48 hours.

parts by weight Kelcoloid were substituted for the 10 parts by weight Keltrol.

EXAMPLE 22

Fifteen grams of Klugel MF were blended with 10 grams of CMC 7HF in a dough-type mixer. Six grams of glycerin were added and mixed into the blend to wet the carboxymethyl cellulose particles and 40 grams of propylene glycol were then added and mixing was continued until the composition was uniform. 0.05 gram of methyl parsept preservative were dry blended with the carboxymethyl cellulose.

The compositions prepared by Examples 20 through 22 were sent to an industrial testing laboratory for eye irritation tests on rabbits. The following test procedure was used in the evaluation of each of the formulations:

A group of five New Zealand strain albino rabbits was used to evaluate the eye irritation properties of the test material. The test method employed was patterned after one described by Draize et al., "Methods for the Study of Irritation and Toxicity of Substances Applied Topically to the Skin and Mucous Membranes," Journal of Pharmaceutical and Experimental Therapy, 82, Dec. 4, 1944. In the test, 100 mg. of shavings of the test material was instilled into the conjunctival sac of the right eye of each test rabbit. The left eye of each animal was used as a scoring control. After 1 minute, 1 hour, 24 hours, 72 hours, and 7 days, the cornea, iris, and conjunctiva were examined and graded for irritation and injury according to a standard scoring system described by Draize et al. Under the scoring system, the maximum possible score for any one examination at each scoring period is 110 points which indicates maximal irritation and damage to all three ocular tissues. Zero score indicates no irritation whatever. The scoring system used is given in Table II.

TABLE II.—EYE IRRITATION TEST—ALBINO RABBITS
Scale of Weighted Scores for Grading the Severity of Ocular Lesions I. Cornea:
  A. Opacity —degree of density (area which is most dense is taken for reading):
    Scattered or diffuse area—details of iris clearly visible.... 1
    Easily discernible translucent areas, details of iris slightly obscured.................................................. 2
    Opalescent areas, no details of iris visible, size of pupil barely discernible........................................... 3
    Opaque, iris invisible....................................... 4
  B. Area of cornea involved.
    One quarter (or less) but not zero............................ 1
    Greater than one quarter but less than one-half............. 2
    Greater than one-half but less than three quarters.......... 3
    Greater than three quarters, up to whole area................ 4
  Score equals A × B × 5. Total maximum = 80

II. Iris:
  A. Values:
    Folds above normal, congestion, swelling, circumcorneal injection (any or all of these or combination of any thereof), iris still reacting to light (sluggish reaction is positive) 1
    No reaction to light, hemorrhage, gross destruction (any or all of these)........................................ 2
  Score equals A × 5. Total maximum = 10

III. Conjunctiva:
  A. Redness (refers to palpebral conjunctiva only):
    Vessels definitely injected above normal.................... 1

TABLE II.—Eye Irritation Test—Albino Rabbits—Con.

Scale of Weighted Scores for Grading the Severity of Ocular Lesions

| | |
|---|---|
| More diffuse, deeper crimson red, individual vessels not easily discernible | 2 |
| Diffuse beefy red | 3 |
| B. Chemosis: | |
| Any swelling above normal (includes nictitating membrane) | 1 |
| Obvious swelling with partial eversion of the lids | 2 |
| Swelling with lids about half closed | 3 |
| Swelling with lids about half closed to completely closed | 4 |
| C. Discharge: | |
| Any amount different from normal (does not include small amount observed in inner canthus of normal animals) | 1 |
| Discharge with moistening of the lids and hairs just adjacent to the lids | 2 |
| Discharge with moistening of the lids and hairs and considerable area around the eye | 3 |
| Score (A+B+C)×2. Total maximum=20 | |

NOTE.—The maximum total score is the sum of all scores obtained for the cornea, iris and conjunctiva.

The results of the tests are recorded in Table III as averages for the five rabbits at each test time:

TABLE III

| Examples: | Average Test Results | | |
|---|---|---|---|
| Test Time | 20 | 21 | 22 |
| 1 Min. | 4.4 | 6.0 | 6.8 |
| 1 Hr. | 8.0 | 12.6 | 6.8 |
| 24 Hrs. | 3.2 | 2.4 | 1.6 |
| 72 Hrs. | 0.0 | 0.0 | 0.0 |
| 7 Days | 0.0 | 0.0 | 0.0 |

It will be noted from Table II that the classification system places special emphasis on irritation or damage to the cornea and correspondingly less stress was placed on conjunctival and iridal effects.

In the rabbit tests of Examples 20–22, transient conjunctival irritation was noted 1 minute after installation in each case and at the 1-hour point iridal irritation was also noted in two rabbits for the Example 20 tests and in three rabbits for the Example 22 tests. In all examples, the ocular tissues returned to normal within 24 to 72 hours.

EXAMPLES 23 AND 24

Using the procedure of Example 23, compositions were made from the following ingredients:

| Example 23 | Example 24 |
|---|---|
| 25 grams Klugel MF | 20 grams Klugel MF |
| 6 grams glycerin | 5 grams CMC-7MF |
| 50 grams Propylene Glycol | 6 grams glycerin |
| 0.05 gram Methylparsept | 40 grams propylene glycol |
| | 0.05 gram methyl parsept |

Both Examples 23 and 24 set up quickly and the examples illustrate additional nonstarch containing formulations. Both also had good adhesive properties.

A hand lotion was prepared by adding the gelled reaction product of Example 20 to an oil/water emulsion of the type normally used in the preparation of lotions, until the desired lotion thickness or consistency was reached. No lanolin or other wax was used in the composition.

A series of compositions was prepared using the basic formulation of Example 20 but with the pH of the reaction system adjusted to various values from 3.5 to 12, using additions of benzoic acid or lime as needed to adjust the pH. The pH values used are shown in the chart in FIG. 4. Immediately after mixing a sample of each composition was run through a General Electric-Zahn Viscosimeter (Cup size: 44 cc., No. G with an 0.168-inch orifice) and each had approximately the same flow rate, requiring about 3 minutes to flow through the viscometer. The compositions were then observed 1 hour later and the four compositions prepared at pH's of 7, 7.5, 8 and 8.5 had already formed a soft solid tacky gel. At 2 hours after mixing the samples of the compositions were again visually observed and were run through the viscometer. The compositions formed at pH's 6 through 9.5 were very hard gels which would not run through the viscometer within 8 minutes. The samples at pH 5.5 and 10 were semirigid and the samples at pH 3.5, 4, 5, 11 and 11.5 had not formed a solid gel. The viscometer flow times for each sample tested 2 hours after mixing are shown in the chart of FIG. 4. Another set of similar compositions was prepared using acetic acid in place of the benzoic acid and the gel results were similar. Thus, where a solidified gel is desired, it should be prepared at a pH in the range of 5.5 through 11, hard at 6 through 9.5 and progressively softer therebeyond down to at least 3.5 and up to at least 12.

A variety of different types of plastic gels having different consistencies, adhesiveness and other physical properties, can be prepared according to this invention. As guide lines toward specific desired properties, adhesiveness appears to be greater when cellulose gums are used than when the alginates are used and the use of starch also apparently tends to increase adhesiveness. The body of the gel can be regulated to some extent by regulating the amount of diluent or carrier included within the gel. Catalysts and pH adjustment also tend to increase the body of the gel and catalysts provide a faster cure time especially in the case of alginates. Where bacterial growth is to be completely eliminated, the synthetic carboxymethyl cellulose gum should be used or, where alginates are used, a small amount of preservative should be added. Inclusion of Karaya correspondingly decreases the efficiency of the alginate or cellulose gum to an extent directly proportional to the amount of Karaya used, and although Karaya can be accommodated in the compositions, e.g., up to about 80 percent or 90 percent of the total gum, it should not be used to fully substitute the alginate or cellulose gums. I prefer to use no more than 50 percent Karaya based on total gum. Karaya increases bacteria growth, decreases gel shelf life in that it hardens on aging and decreases adhesiveness of the composition and can be used when these effects are either desired or of no consequence in the intended use.

An important aspect of the present invention is the ability to produce a product which has the same beneficial characteristics and physical properties as Karaya and possesses additional properties which lends the product to less limited possibilities of application in the field of medicine, the food industry, dentistry, veterinary medicine and cosmetics. For example, compositions of the present invention can be produced which are tacky to the touch and when moistened make good adhesives. The physical mass of the gel lends itself to injection molding techniques for producing forms of various shapes. The material is nontoxic to man, water-soluble, edible and the base material precursors are F.D.A. approved for human consumption, and the composition is completely absorbable by the chemical process of a human or other mammal body. Especially where cellulose gum is used in making the products, the product has the additional ability of supporting absolutely no bacterial growth. Even when alginates are used, only very little bacterial growth can be supported by the composition. In either case to be absolutely safe, a small amount of preservative can be added to overcome any tendency toward supporting bacterial growth.

During manufacture of the compositions, concentrations of antibiotics, drugs, antibacterial agents, and/or cosmetics can be included while producing a solid rubbery mass. The material can then be applied to the body, either animal or human, or inserted into the body either through surgery, suppositories, injections or oral means and its unusual property of being slowly dissolved and accepted by the body permits a time effect treatment and more effective localized treatment. Many specific applications such as use in suppository bandages for hemorrhoidectomies, thyroid treatment, injection suppositories for treatment of the prostate, packing material to prevent loss of muscle tone during healing after removal of an eye, packing for broken noses. As a more specific example, a molded ring such as shown in the drawing can be used in colostomy, ileostomy and related applications by applying around the stomal to seal an appliance to the skin in such a way that stomal discharge is kept off the patient's skin while promoting healing of skin which may be excoriated from stomal discharge.

In the field of dentistry, the material can be used to fill pockets left from tooth extractions and can also be formulated as a dental adhesive. Body lotions for skin treatment can also be provided by this invention by replacing the lanolin or other wax material in the lotion emulsion system with the gelled reaction product.

The material is also suitable for skin treatment to treat burns, bed sores, and other conditions, adhering to the skin via its adhesive properties and preventing contamination and lessening the possibility of bacterial infection while providing drug treatment against toxic poisoning using the time effect treatment characteristics of the material. Additionally, the material can be molded in the form of implements or devices for internal or external use, e.g., birth control devices, dissolvable valves, dissolvable catheters and dissolvable bypass tubes which could be used during surgery and later dissolved by the body. The present compositions are quite useful in the above areas of application on or in animal bodies for experimental purposes to test effects of various drugs or medication on the animal or on a particular disease, as packing in organ transplant experiments, treatment of organic disorders and other uses.

I claim:

1. The method of manufacturing a plastic product which comprises reacting a hydrophilic colloid selected from the group consisting of alginate gum and carboxymethylcellulose gum with propylene glycol as a cross-linking agent in an organic water-soluble liquid medium selected from the group consisting of propylene glycol and glycerin until the glycol cross-links the gum to a plastic consistency.

2. The method of claim 1 wherein said liquid medium is glycerin.

3. The method of claim 1 wherein the reacting mass includes from 0.2 to 2 parts by weight of a catalyst selected from the group consisting of calcium carbonate, calcium chloride, sodium benzoate, benzoic acid and aluminum hydroxide.

4. The method of claim 3 wherein said catalyst is aluminum hydroxide.

5. The method of claim 3 wherein the catalyst is selected from the group consisting of calcium carbonate and calcium chloride.

6. The method of claim 3 wherein the catalyst is selected from the group consisting of benzoic acid and sodium benzoate.

7. The method of claim 1 wherein the pH of the reaction mixture is above about 5.

8. The method of claim 7 wherein the pH of the reaction mixture is below about 11.

9. The method of claim 1 including the step of including starch in the reacting mass in an amount in the range of 10 to 50 weight percent based on total carrier and cross-linked gum.

10. The method of claim 9 including the step of precoating the starch with wetting agent before its inclusion in the reaction mass.

11. The method of claim 1 including the step of mixing medication with the colloid and polyol prior to gelling of the reaction mass.

12. The method of claim 1 including the step of molding the reaction mass to a form.

13. The method of claim 12 wherein said molding step comprises extruding the reaction mass as it is gelling to plastic consistency.

14. The method of claim 1 including the step of adding the gel to a lotion base water emulsion until the emulsion is brought up to creamy consistency.

* * * * *